(12) United States Patent
Murdoch et al.

(10) Patent No.: US 9,165,171 B2
(45) Date of Patent: Oct. 20, 2015

(54) IDENTIFICATION DEVICE AND IDENTIFICATION SYSTEM

(71) Applicant: Sato Vicinity Pty Ltd, Clayton (AU)

(72) Inventors: Graham Alexander Munro Murdoch, Wollstonecraft (AU); Stuart Colin Littlechild, Haberfield (AU)

(73) Assignee: SATO VICINITY PTY LTD, Victoria (AU)

( * ) Notice: Subject to any disclaimer, the term of this patent is extended or adjusted under 35 U.S.C. 154(b) by 0 days.

(21) Appl. No.: 14/220,205

(22) Filed: Mar. 20, 2014

(65) Prior Publication Data

US 2014/0232533 A1    Aug. 21, 2014

Related U.S. Application Data

(63) Continuation of application No. 13/891,681, filed on May 10, 2013, now abandoned, which is a continuation of application No. 10/525,408, filed as application No. PCT/AU03/01072 on Aug. 22, 2003, now abandoned.

(30) Foreign Application Priority Data

Aug. 22, 2002    (AU) ................ 2002950973

(51) Int. Cl.
*G01S 13/74*    (2006.01)
*G06K 7/10*    (2006.01)
*G06K 19/07*    (2006.01)

(52) U.S. Cl.
CPC ........ *G06K 7/10366* (2013.01); *G06K 7/10009* (2013.01); *G06K 19/0701* (2013.01); *G06K 19/0723* (2013.01)

(58) Field of Classification Search
CPC .......... G06K 19/0701; G06K 19/0723; G06K 19/07749; G06K 19/07786; G06K 7/10009; G08B 13/2431
USPC ................ 340/10.1, 10.2, 10.3, 10.31, 10.4, 340/10.41, 10.5, 10.52, 572.1, 572.7
See application file for complete search history.

(56) References Cited

U.S. PATENT DOCUMENTS

| | | |
|---|---|---|
| 3,299,424 A | 1/1967 | Vinding |
| 4,019,181 A | 4/1977 | Olsson et al. |
| 4,075,632 A | 2/1978 | Baldwin et al. |
| 4,546,241 A | 10/1985 | Walton |
| 5,045,770 A | 9/1991 | Brooks et al. |

(Continued)

FOREIGN PATENT DOCUMENTS

| | | |
|---|---|---|
| EP | 0011810 | 6/1980 |
| EP | 0111753 | 6/1984 |

(Continued)

*Primary Examiner* — Nabil Syed
(74) *Attorney, Agent, or Firm* — Sughrue Mion, PLLC

(57) ABSTRACT

A preferred embodiment of the invention includes: an identification device (1) for receiving a first signal and transmitting a second signal, the device including: a receiving means (35) for receiving the first signal to generate a voltage; an integrated circuit (37) having a state selection means (41) for selecting whether the device (1) is in a first state or a second state; a connection (39) between the receiving means (35) and the integrated circuit (37); a transmission means (45) for generating the second signal. The invention also includes a system (50) that includes an interrogator (43) for interrogating a plurality of the identification devices (1).

33 Claims, 9 Drawing Sheets

(56) References Cited

U.S. PATENT DOCUMENTS

| | | | |
|---|---|---|---|
| 5,153,583 A | 10/1992 | Murdoch | |
| 5,517,194 A | 5/1996 | Carroll et al. | |
| 5,523,749 A * | 6/1996 | Cole et al. | 340/10.34 |
| 5,550,536 A | 8/1996 | Flaxl et al. | |
| 5,606,323 A | 2/1997 | Heinrich et al. | |
| 5,625,341 A | 4/1997 | Giles et al. | |
| 5,887,176 A | 3/1999 | Griffith et al. | |
| 5,963,144 A | 10/1999 | Kruest | |
| 5,970,398 A | 10/1999 | Tuttle | |
| 6,005,638 A | 12/1999 | Blair et al. | |
| 6,034,603 A | 3/2000 | Steeves | |
| 6,061,475 A | 5/2000 | Blair | |
| 6,072,383 A | 6/2000 | Gallagher, III et al. | |
| 6,157,821 A | 12/2000 | Boesch et al. | |
| 6,229,443 B1 | 5/2001 | Roesner | |
| 6,294,953 B1 | 9/2001 | Steeves | |
| 6,329,944 B1 | 12/2001 | Richardson et al. | |
| 6,392,544 B1 | 5/2002 | Collins et al. | |
| 6,404,325 B1 | 6/2002 | Heinrich et al. | |
| 6,427,065 B1 | 7/2002 | Suga et al. | |
| 6,515,919 B1 * | 2/2003 | Lee | 365/192 |
| 6,525,648 B1 | 2/2003 | Kubler et al. | |
| 6,538,564 B1 | 3/2003 | Cole et al. | |
| 6,570,487 B1 | 5/2003 | Steeves | |
| 6,954,859 B1 | 10/2005 | Simerly et al. | |
| 7,005,985 B1 | 2/2006 | Steeves | |
| 7,271,727 B2 | 9/2007 | Steeves | |
| 7,286,158 B1 | 10/2007 | Griebenow | |
| 2001/0035461 A1 | 11/2001 | Sedlak et al. | |
| 2003/0007473 A1 | 1/2003 | Strong et al. | |
| 2006/0066444 A1 | 3/2006 | Steeves | |
| 2006/0071756 A1 | 4/2006 | Steeves | |
| 2007/0159338 A1 | 7/2007 | Beber et al. | |
| 2007/0205896 A1 | 9/2007 | Beber et al. | |
| 2007/0285241 A1 | 12/2007 | Griebenow et al. | |
| 2008/0042850 A1 | 2/2008 | De Witte et al. | |

FOREIGN PATENT DOCUMENTS

| | | |
|---|---|---|
| EP | 0254954 | 2/1988 |
| EP | 1045526 A1 | 10/2000 |
| EP | 1061633 | 12/2000 |
| FR | 2757952 A1 | 7/1998 |
| GB | 2163324 | 2/1986 |
| GB | 2321726 | 8/1998 |
| JP | 2001-160767 | 6/2001 |
| JP | 2002/521770 | 7/2002 |
| WO | WO-92/22045 | 12/1992 |
| WO | WO-9222045 | 12/1992 |
| WO | WO-98/43218 | 10/1998 |
| WO | WO-9843218 | 10/1998 |
| WO | WO-00/07141 | 2/2000 |
| WO | WO-02/27650 | 4/2002 |
| WO | WO-2004/019055 A1 | 3/2004 |

* cited by examiner

IDENTIFICATION DEVICE AND IDENTIFICATION SYSTEM

CROSS-REFERENCE TO RELATED APPLICATIONS

This patent application is a continuation application of U.S. patent application Ser. No. 13/891,681. U.S. patent application Ser. No. 13/891,681 is a continuation application of U.S. patent application Ser. No. 10/525,408. U.S. patent application Ser. No. 10/525,408 is a national-stage filing of International Patent Application No. PCT/AU2003/001072. International Patent Application No. PCT/AU2003/001072 was filed on Aug. 22, 2003. International Patent Application No. PCT/AU2003/001072 claims priority from Australian Patent Application AU 2002950973, which was filed on Aug. 22, 2002. U.S. patent application Ser. No. 13/891,681, U.S. patent application Ser. No. 10/525,408, International Patent Application No. PCT/AU2003/001072, and AU 2002950973 are incorporated herein by reference.

FIELD OF INVENTION

The present invention relates to an identification device, and system incorporating such.

The invention has been developed primarily as a radio frequency identification ("RFID") tag for a parcel, document, or postal handling system and will be described hereinafter with reference to these applications. However, the invention is not limited to those particular fields of use and is also suitable to inventory management, stock control systems, and other applications.

BACKGROUND

Passive RFID tags are known, and generally include a resonant tuned antenna coil electrically connected to an integrated circuit (IC). Examples of such RFID tags include: U.S. Pat. No. 5,517,194 (Carroll et al); U.S. Pat. No. 4,546,241 (Walton); U.S. Pat. No. 5,550,536 (Flaxel); and U.S. Pat. No. 5,153,583 (Murdoch).

Systems that employ RFID typically include an interrogator that generates a magnetic field at the resonant frequency of the tuned antenna coil. When the coil is located within the magnetic field, the two couple and a voltage is generated in the coil. The voltage in the coil is magnified by the coil's Q factor and provides electrical power to the IC. With this power, the IC is thereby able to generate a coded identification signal that is ultimately transmitted to the interrogator.

Limitations arise because the resonant current that flows in the tuned antenna coil also generates a magnetic field in the region of the coil. That is, if there is an object—such as a second tag with a second coil—disposed near the first coil, the voltage generated by the first coil (and the second coil as well) will be reduced by the partial cancellation—or even complete cancellation—of these respective fields. In turn, this consequential reduction in power will not allow the first tag (and likely the second tag as well) to reliably provide an identification signal to the interrogator.

In this light, many fields that employ such tags—such as baggage handling services, letter carrying services, inventory management systems, etc.—cannot be processed in "dense" configurations. In other words, such articles must be sufficiently spread apart for the tags—and systems incorporating such tags—to operate reliably. Such "density" limitations thus tend to result in speed and efficiency restrictions.

The discussion of the prior art within this specification is to assist the addressee understand the invention and is not an admission of the extent of the common general knowledge in the field of the invention.

SUMMARY OF THE INVENTION

It is an object of the present invention to overcome, or at least substantially ameliorate, one or more of the disadvantages of the prior art or at least to provide a useful alternative.

According to a first aspect of the invention there is provided a radio frequency identification ("RFID") device, the device including:

an antenna for receiving an interrogation signal; and a transceiver connected to the antenna and being responsive to the interrogation signal, whereby the transceiver selectively draws current from the antenna.

Preferably, the transceiver toggles between a first state and a second state, wherein the current drawn by the transceiver during the first state is greater than the current drawn during the second state. More preferably, the transceiver selects the second state more frequently than the first state. Even more preferably, the probability of selecting the second state is at least twice the probability of selecting the first state.

In a preferred embodiment, the transceiver has an operating cycle wherein, during that cycle, the transceiver is in either the first or the second state. Preferably, the transceiver selects the first state with a probability of less than $\frac{1}{2}$. More preferably, the probability is less than $\frac{1}{4}$. Even more preferably, the probability is less than or equal to $\frac{1}{16}$. Accordingly, the first state is not necessarily selected in each cycle. In signal use, the interrogation signal is generated in a predetermined area by an interrogator. Preferably, the device is maintained within the signal field for more than one cycle. More preferably, the device is maintained within the field for at least the number of cycles equal to the reciprocal of the probability of the first state being selected.

In a preferred form, the selection of the first state and the second state is based upon a predetermined algorithm. An example of a preferred algorithm is a random or a pseudo-random number.

Preferably, the antenna and the transceiver are mounted to a common substrate. More preferably, the antenna is a coil and the current generated in the coil is in response to the interrogating signal.

Preferably, during the first state, the current drawn by the transceiver is to allow its operation. That is, the first state is a normal state, while the second state is a standby state. For example, in the normal state the current supplies the relevant clock circuits, the signal processing circuit, and the like. In this state, the current also allows the transceiver to generate an identification signal.

More preferably, the transceiver relies upon the current to drive the antenna to transmit the identification signal. In other embodiments, the device includes a separate transmission antenna and the transceiver drives that separate antenna to transmit the identification signal. In both cases, the current drawn from the antenna is the source of power for the generation and transmission of the identification signal.

The device is preferably passive in that it does not have an onboard power source. However, the invention is also applicable to active devices wherein the life of the onboard power source is prolonged.

According to a second aspect of the invention there is provided a radio frequency identification ("RFID") device, the device including:

an antenna for receiving an interrogation signal and being responsive to the signal for supporting an antenna current;

a coupling connected to the antenna for toggling the antenna current between a first state and a second state, wherein the antenna current in the first state is greater than the antenna current in the second state; and a transceiver connected to the coupling and drawing an operational current that is derived from the antenna current, whereby the transceiver is selectively responsive to the interrogation signal to generate an identification signal.

Preferably, during the first state the transceiver is responsive to the interrogation signal to generate the identification signal. More preferably, in the second state the device is responsive to the interrogation signal only for the purpose of toggling the antenna current between the first and second states. That is, the first state is a normal current state, whereas the second state is a low current or standby state.

Preferably also, the antenna is responsive to the transceiver for transmitting the identification signal. In other embodiments, however, the device includes a separate antenna that is responsive to the transceiver for transmitting the identification signal.

According to a third aspect of the invention there is provided a system for identifying articles that are collocated with an RFID tag of the first aspect, the system including:

an interrogator for providing an interrogating field;

a plurality of identification devices mounted to the respective articles, the devices including:

respective antennas for being contemporaneously disposed within the field and being responsive to that field for providing antenna currents;

respective transceivers that are connected to the antennas for selectively toggling the currents between an operational state and a standby state such that not all the currents are simultaneously in the operational state, whereby the transceivers are responsive to the currents for providing identification signals that include identification data unique to the respective articles; and a receiver for processing the identification signals to extract the identification data and thereby identify the respective articles.

Preferably, the current drawn by the transceiver during the operational state is greater than the current drawn during the standby state. More preferably, the transceiver selects the standby state more frequently than the operational state. Even more preferable, the probability of selecting the second state is at least twice the probability of selecting the first state.

In the preferred embodiments, the transceiver has an operating cycle with a start and a finish wherein, during that cycle, the transceiver is in either the first or the second state. Preferably also, the transceiver selects the first state with a small probability of less than ½. More preferably, the probability is less than ¼. Even more preferably, the probability is less than or equal to 1/16.

In a preferred form, the selection of state is based upon a predetermined algorithm. An example of a preferred algorithm is a random or a pseudo-random number used to determine the state selection of the transceiver.

Preferably, the identification signals are transmitted while the respective transceivers are in the first state. More preferably, the transceivers use the respective antennas to transmit the identification signals. In other embodiments, however, the devices include respective second antennas that are used by the transceivers to transmit the identification signals.

According to a fourth aspect of the invention there is provided a radio frequency identification ("RFID") device including:

an antenna that is responsive to an interrogation signal for providing an antenna current; and a transceiver for selecting between a normal state and a standby state wherein, during the normal state, the transceiver is responsive to the interrogation signal for generating an identification signal and, during the standby state, the transceiver is only responsive to the interrogation signal for selecting between the normal and standby states.

Preferably, in the absence of the interrogation signal the device is inactive. Conversely, in the presence of an interrogation signal, the device is either in the normal state or the standby state. Preferably, the normal state has a short duration and, therefore, the device is predominantly in the standby state in the presence of an interrogating signal. Preferably, during the standby state, the device is only responsive to the interrogation signal for the purpose of selecting between normal and standby states.

According to an fifth aspect of the invention, there is provided a voltage regulator for a radio frequency identification ("RFID") device; the device having: an antenna for receiving an interrogation signal and for transmitting an identification signal and a transceiver for being responsive to the interrogation signal to generate the identification signal. The regulator including:

a current coupling for providing a supply voltage to the transceiver, the current coupling, in the first state, drawing a first current from the antenna and, in the second state, drawing a second current from the antenna that is less than the first current.

According to a sixth aspect of the invention, there is provided an identification device for receiving a first signal and transmitting a second signal, the device including:

a receiving means for receiving the first signal and employing the first signal to generate a voltage;

wherein the receiving means generates a first current from the voltage;

an integrated circuit that selectively controls the amount of the first current in the receiving means;

a connection between the receiving means and the integrated circuit;

a transmission means for generating the second signal;

a state selection means for selecting whether the device is in a first state or a second state;

wherein—relative to the second state—a relatively larger amount of the first current flows through the receiving means when the device is in the first state; and wherein—relative to the first state—a relatively smaller amount of the first current flows through the receiving means when the device is in the second state.

According to a seventh aspect of the invention, there is provided a system for identifying articles, the system including:

a signal generator for generating a first signal;

a plurality of articles;

a plurality of identification devices, each individual device being respectively associated with each individual article;

wherein each device includes:

a receiving means for receiving the first signal and employing the first signal to generate a voltage;

wherein the receiving means generates a first current from the voltage;

an integrated circuit that selectively controls the amount of the first current in the receiving means;

a connection between the receiving means and the integrated circuit;

a transmission means for generating the second signal;

a state selection means for selecting whether the device is in a first state or a second state;

wherein—relative to the second state—a relatively larger amount of the first current flows through the receiving means when the device is in the first state; and wherein—relative to the first state—a relatively smaller amount of the first current flows through the receiving means when the device is in the second state.

BRIEF DESCRIPTION OF THE DRAWINGS

Preferred embodiments of the invention will now be described, by way of example only, with reference to the accompanying drawings, in which.

DETAILED DESCRIPTION OF THE INVENTION

Introductory Comments Regarding the Figures' Symbolic Representation

Figure 1:
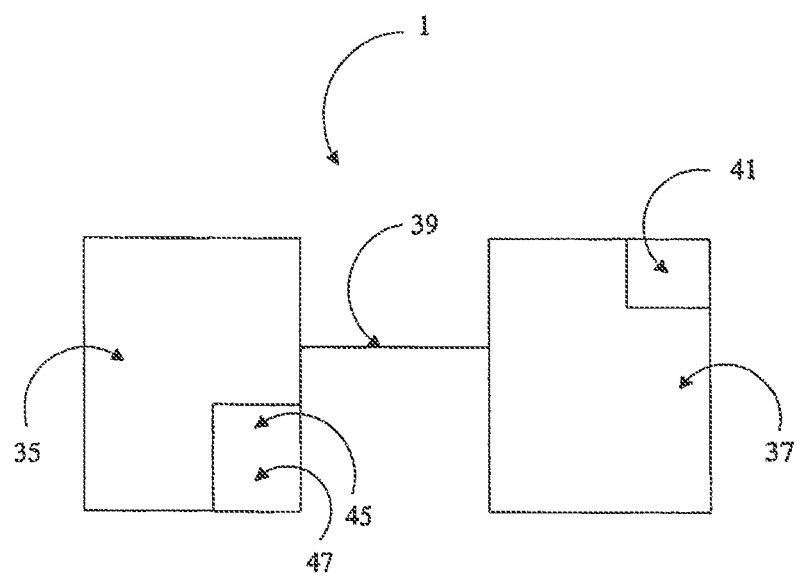
FIG. 1 is a schematic representation of a device according to a preferred embodiment of the invention.
Figure 2:
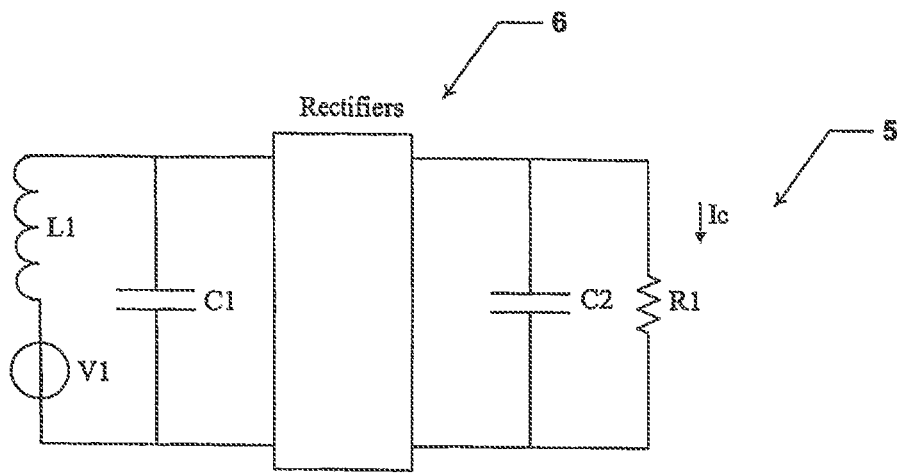
FIG. 2 is a symbolic circuit diagram of a typical prior art tag.

It is important to note at the outset that FIGS. 3 to 11, and 15 to 18 are "symbolic" models of preferred embodiments of the invention, and FIG. 2 is "symbolic" of a prior art tag. In contrast, FIG. 1 is a schematic representation of the invention.

That is, as shown in FIG. 1, a preferred embodiment of the invention is comprised of a receiver portion 35; an integrated circuit 37 with one or more functionalities; a connection 39 between the two; and a state selection means 41 that determines whether the device is in a first state or a second state; and a transmission means 45—preferably in the form of an antenna 47. Again, these components are reflected symbolically in FIGS. 3 to 11, and 15 to 18.

A First Embodiment of the Invention

Figure 3:
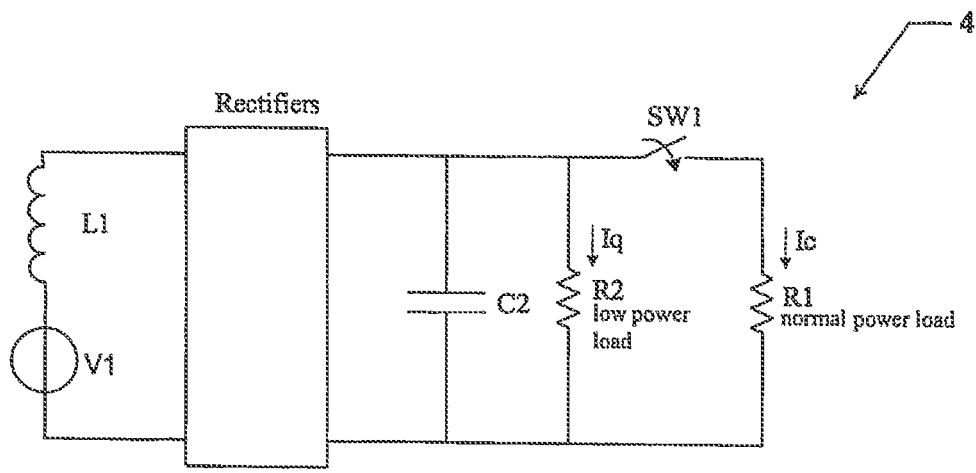
FIG. 3 is a symbolic circuit diagram of an RFID device according to one embodiment of the invention.

A first embodiment of the invention, in the form of a radio frequency identification ("RFID") device or tag 1, is symbolically illustrated in FIG. 3. The tag includes a multi-turn coil 3 for receiving an interrogation signal. A transceiver, in the form of an integrated circuit (IC) 4, is connected to the coil 3 and is responsive to the interrogation signal. In other embodiments, other devices are used as the transceiver; such devices will be readily apparent to those skilled in the art. In this embodiment, coil 3 and the circuit 4 are mounted on a common generally rectangular substrate 2. In other preferred embodiments, the IC includes a memory 42.

Two "States"

Circuit 4 toggles between a first state and a second state, wherein the current drawn from the coil 3 by the circuit 4—in the presence of the interrogation signal—during a first state is greater than the current drawn during a second state. More specifically, circuit 4 has a current cycle during which the circuit randomly selects either the first or the second state for the duration of the cycle. The random selection of state during the cycle by each individual tag reduces the risk of two adjacent tags simultaneously operating in the first state.

Moreover, in this embodiment, the selection of the second state by circuit 4 is about 16 times more probable than the selection of the first state. That is, the probability of the circuit 4 drawing a high current—and thereby jeopardizing the performance of an adjacent tag, and itself, by their mutual coupling is 1/16. Accordingly, the tags may operate at a much smaller spatial separation than could be achieved by prior art tags.

The state selection means is implemented with digital circuits. These circuits are designed to select the current state according to the chosen algorithm or method. There are several methods which can be used to implement the state selection circuits. Logic gates can be used to create a dedicated logic circuit for determining the state selection. A state engine consisting of logic arrays can be designed to implement the state selection function. A microcontroller or processor can execute software instructions that code for the chosen algorithm or method. The preferred embodiment is a logic array controlled by a microcontroller. The microcontroller software executes the slower parts of the chosen algorithm or method while the logic array performs the faster parts of the chosen algorithm or method.

Dimensions

The substrate 2 is about 80 mm by 50 mm, and includes a plurality of layers that are laminated together to encapsulate the coil 3 and the circuit 4. In this embodiment, the thickness of the tag 1 is about 0.3 mm. In other embodiments, the dimensions of tag 1 are bigger or smaller. That is, it is generally preferable for the tag to be sized such that it may be unobtrusively incorporated into packaging and other articles.

Devices Used to Transmit the Identification Signal

In the preferred embodiment, the coil 3 transmits an identification signal generated by the transceiver. In other embodiments, a second separate antenna coil is used to transmit the identification signal.

Devices Used to Receive the Interrogation Signal

Figure 16:
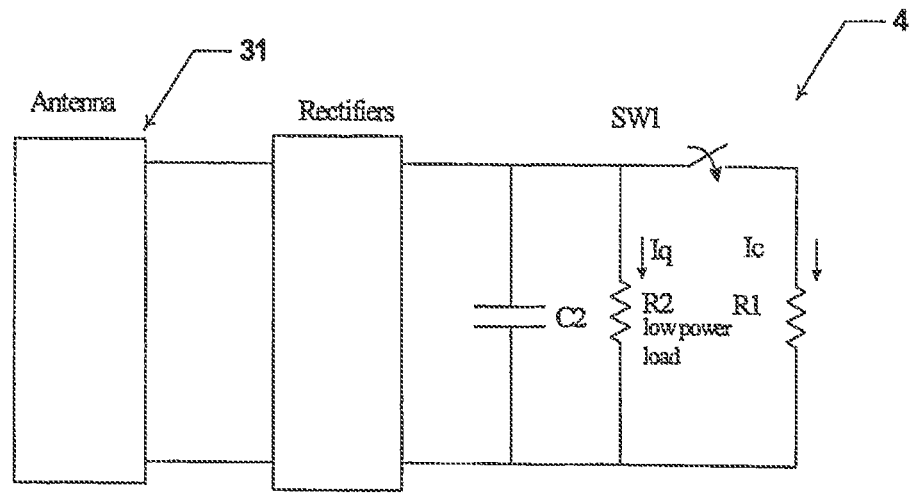
FIG. 16 is an alternative symbolic embodiment to that of FIG. 3, where the antenna coil is substituted with a generic interrogation signal-receiving device.
Figure 17:
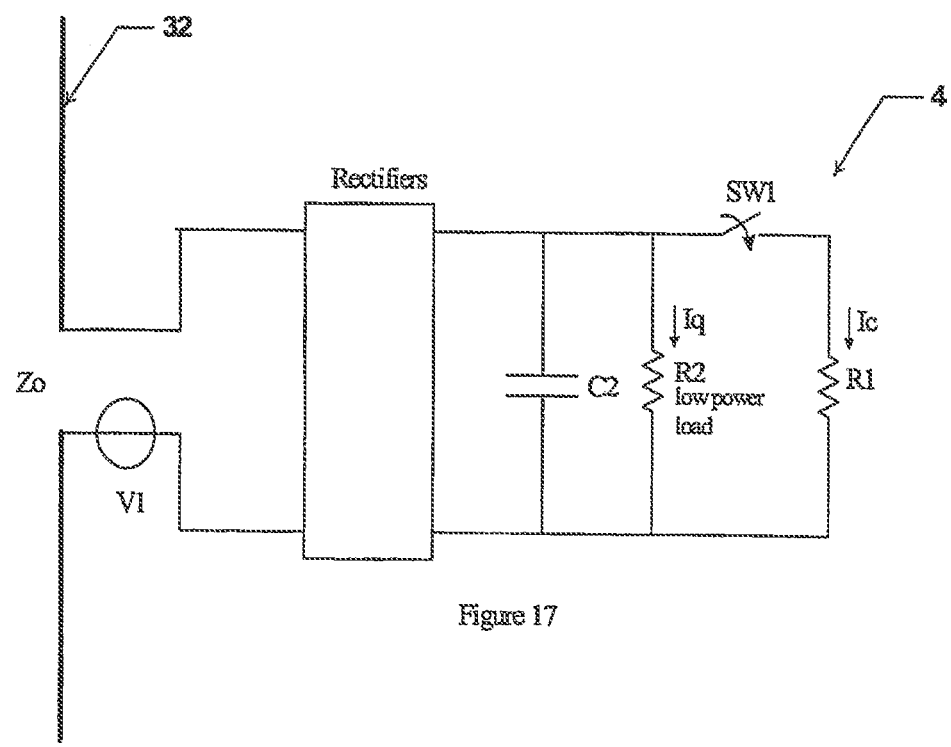
FIG. 17 is an alternative symbolic embodiment to that of FIG. 3, where the antenna coil is substituted with a dipole antenna.
Figure 18:
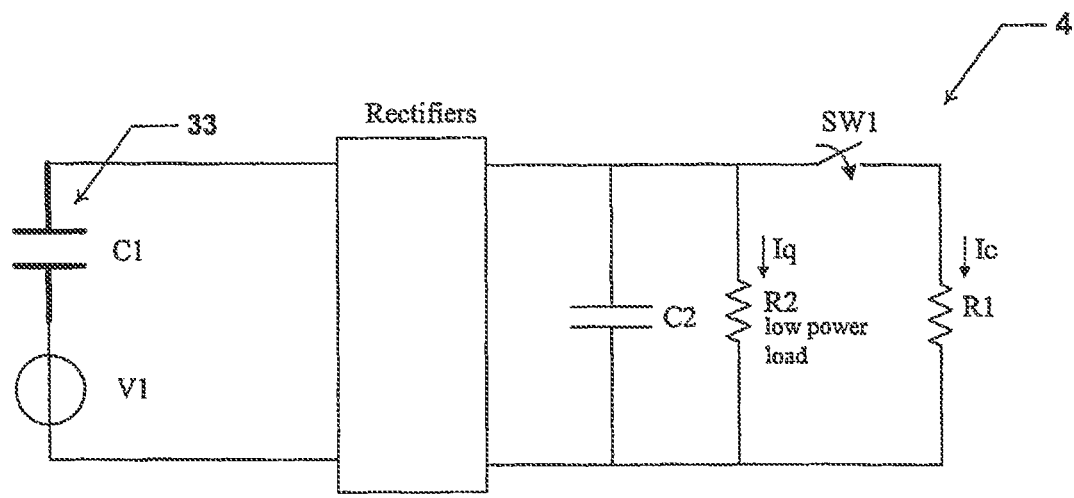
FIG. 18 is an alternative symbolic embodiment to that of FIG. 3, where the antenna coil is substituted with a capacitive antenna.

While in this embodiment, the antenna is the coil 3, other devices may be employed to receive the interrogation signal. Examples of such alternative devices are shown in FIGS. 16, 17 and 18. In FIG. 16, the interrogation signal is received by a non-specific or generic receiving device 31. As shown in FIG. 17 includes a dipole antenna 32 is used for receiving a radiated interrogation signal. In other embodiments (not shown), device 31 is a monopole. In still further embodiments, such as that illustrated in FIG. 18, device 31 includes a capacitive antenna 33 for receiving an electric, capacitive, or interrogation signal. Further, it will be understood by the skilled addressee from the teaching herein that the invention is applicable to still other receiving devices, and is not limited by the choice of antenna or the specific form of interrogation signal.

The Typical Operation of Prior Art Tags

Before further describing the embodiments of the invention, the operation of a typical prior art tag will be examined. A typical tag includes a circuit 5 illustrated schematically in FIG. 2. Particularly, the voltage V1 is induced in antenna coil by the interrogation field, and the antenna coil L1 is tuned by a tuning capacitor C1. Accordingly, L1 and C1 form a resonant tuned circuit, which magnifies the voltage V1 by the loaded Q factor of the antenna coil. The AC voltage generated across the tuned circuit is rectified by a rectifier 6, and the DC output voltage is stored on a storage capacitor C2. The DC load of the IC is represented by R1.

Figure 11:
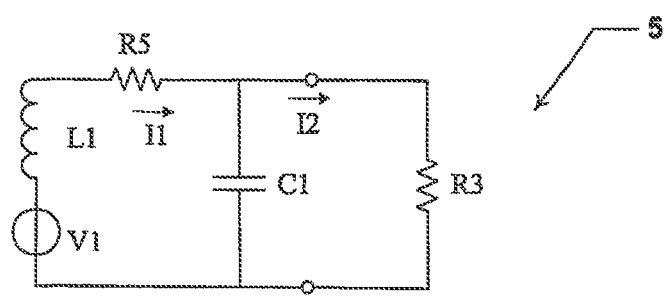
FIG. 11 is a circuit model for the prior art circuit of FIG. 2.

FIG. 11 shows a circuit model for the prior art circuit 5 where corresponding features are denoted by corresponding notations. The antenna coil is represented by inductance L1 and the coil losses by series resistance R5. The tuning capacitance and circuit stray capacitance are represented by C1, and the losses of the rectifier and IC circuit by R3. The resonant currents circulating in the tuned circuit formed by L1 and C1 are I1; and the output current into R3 is I2.

The capacitor Q factor (Qc=w.R3.C1) normally dominates the total resonant Q factor. Typically, Qc has a value of between 10 and 40. Since the ratio of I1/I2=Q, the resonant current I1 is much larger than the output current I2.

In light of the above, when tags of this type are in close proximity the magnetic field generated by the resonant current couples—through mutual inductance—with proximate tags and, therefore, V1 is diminished. In other words, once the tags are in close proximity—that is, within about 50 mm of each other—such "interference" compromises the reliable operation of the tags.

The Removal of the Resonant Capacitor

It has been appreciated by the inventors that for tags operating in close proximity to each other it is important that these resonant currents are eliminated. Given this, the inventors have found that it is possible to eliminate these resonant currents by disconnecting the resonant capacitor from the antenna coil. However, even with the resonant capacitor removed from prior art devices like that shown in FIG. 2, the antenna current drawn by circuit 5 is still too large to allow a plurality of tags to be closely stacked. Specifically, even without a resonant capacitor, if such tags are placed within a few millimeters of each other, the tags will not operate reliably.

Minimizing the Current in the Second State

When the antenna coil current becomes very small or, as in some cases zero, the coil becomes transparent to the interrogation field. In this state the antenna coil has (a) no effect upon the interrogation field and (b) those tags in the low current state do not interfere with the operation of those tags in the normal current state.

In the low current state, tag 1 is not fully functional. That is, the current drawn from the coil is reduced such that only necessary circuit functions are viable. In a preferred embodiment, the current is in the order of 30 µA. Ideally, the current is zero; or at least minimized as much as possible.

In other embodiments, the minimizing of current is realised by one or more of a variety of methodologies, including:
1. Minimising the required functions to be performed by the circuitry.
2. Utilising low power circuitry. Low power circuitry, while widely understood, are much more difficult to design than conventional circuitry. Low power circuits require less current to operate and consequently draw less current. Using low power circuits for those circuits that must remain operational in the low current state reduces the current drawn during the low current state.
3. The use of onboard energy storage devices and in particular a capacitive device. On board storage devices can provide the current required to operate the circuits in the low current state. For example, a capacitive device can charge up during the normal current state and use the stored charge during the low current state so as to minimise the current drawn from the antenna. Alternatively, a battery can be used to supply the low current state current.

More generally, the impedance seen by the antenna coil should be as large as possible. This is particularly so in the low current state. That is, the quantum of the antenna current is proportional to the quantum of the resistive and/or the reactive load as seen by the coil. When the amount of coil current is too high, coil-to-coil magnetic interference will cause the tags to stop operating reliably.

Operation

In the FIG. 3 embodiment—which does not include a resonating capacitor voltage V1 is induced in the antenna coil L1 by the interrogation field. Further, the antenna voltage is rectified and stored on a DC storage capacitor C2. The generated current is managed by symbolic switch SW1.

A. The Symbolic Switch

The two states can be symbolically reflected by a switch SW1 and resistors R1 and R2. Importantly, these are employed to reflect the two states and are not, in fact, part of the invention.

In other words, switch SW1 reflects the device's operation in the two different "states". In essence, this is further symbolically implemented by resistors R1 and R2—which are representative of the load provided by circuit 4 in the low current state and the normal current state respectively.

With the benefit of the teaching herein, it will be appreciated by those skilled in the art that there are many well known methods for disabling circuits and reducing their current consumption—all of which are applicable to achieve the functionality required. For example, there are various hardware and software methods for putting a microprocessor into a "standby" or a "sleep" state.

B. Current Input by the Symbolic Switch

The change in the current drawn by circuit 4 in the low current and the normal current state corresponds to a change in the antenna coil's current. In the low current state the antenna current is tens of microamperes and in the normal current state the antenna current is hundreds of microamperes. Specifically, typical values are 70 uA in the low current state and 300 uA in the normal current state.

In FIG. 3, the low current state is symbolically represented by switch SW1 being open and the current Iq being drawn through R2. In the low current state, the quiescent current Iq is symbolically drawn. The current Iq is very small and is typically a few tens of microamperes. In this embodiment, Iq symbolically represents the current used to: maintain RAM data stored in CMOS memory, operate logic functions, and power analogue circuitry.

Further, the normal current state is symbolically represented by SW1 being closed and reflects activation of all of circuit 4's functionality. In the normal current state, currents Ic and Iq are drawn. The total current drawn by circuit 4 in the normal current state (Iq+Ic) is typically about 300 uA, although this does vary considerably between embodiments.

A "Model" of FIG. 3

Figure 12:
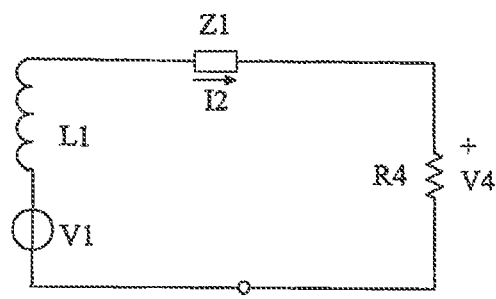
FIG. 12 is a circuit model for the device of FIG. 3.

FIG. 12 illustrates a circuit model for tag 1. Particularly:
(a) the voltage V1 is induced in the antenna coil L1 by the interrogation field.
(b) Impedance Z1 represents the series impedance of the antenna coil and any other series-connected impedance.
(c) R4 symbolically represents the equivalent AC resistance of circuit 4.
(d) Current I2 flows from the antenna coil into R4.
(e) Voltage V4 across R4 symbolically represents the voltage at the antenna terminals of L1 and circuit 4, which is rectified and stored on a DC storage capacitor C2 as shown in FIG. 3.

Accordingly, V4 equals V1 minus the volt drop in L1 and Z1 due to the current I2 flowing through L1 and Z1. That is:

$$V4 = V1 - I2 \cdot (Z1 + jwL1)$$

where jw is the complex frequency in radians per second. This equation can be rearranged into the following two forms.

$$I2 = (V1 - V4)/(Z1 + jwL1)$$

and $$I2 = V1/(R4 + Z1 + jwL1)$$

Adjusting I2

In light of the above, assuming that the voltage V1 and the inductance L1 is fixed, then current I2 is adjusted by varying either V4, R4, or Z1. For instance:
1. I2 is varied by changing V4. That is, by increasing the output voltage more voltage appears at the coil terminals and less current is drawn from the antenna coil.
2. I2 is varied by changing R4. That is, by increasing the AC resistance of the circuit 4 less current is drawn from the antenna coil. And,
3. I2 is varied by changing Z1. That is, by inserting an extra impedance in series with Z1, a larger voltage is dropped in the antenna coil impedance and less current is drawn from the antenna coil.

Embodiments incorporating such techniques will be described below in the context of FIGS. 6, 7, and 8. It will be appreciated by the skilled addressee that elements of these embodiments may be combined to provide alternate adjustments of I2.

Alternate Embodiments

A. Embodiments with a Voltage Multiplier

Figure 4:
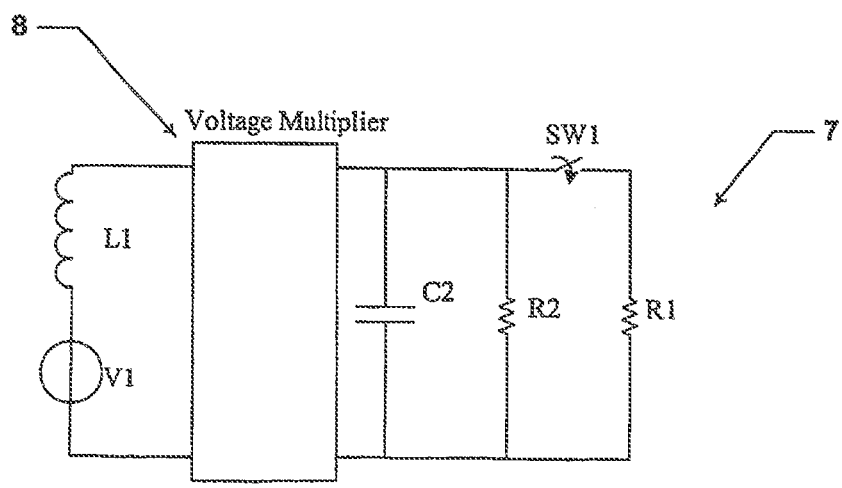
FIG. 4 is a symbolic circuit diagram of another embodiment of the invention that includes a voltage multiplier.

In FIG. 4, an integrated circuit 7 includes a voltage multiplier circuit 8 rather than a rectifier. This is advantageous, since in the absence of resonant tuning, the coil voltage is relatively low because it is not magnified by Q. To compensate, circuit 8 increases the voltage supplied to circuit 7 and allows the circuit to operate with a lower coil voltage; the lower coil voltage also requiring a lower interrogation field.

Figure 5:
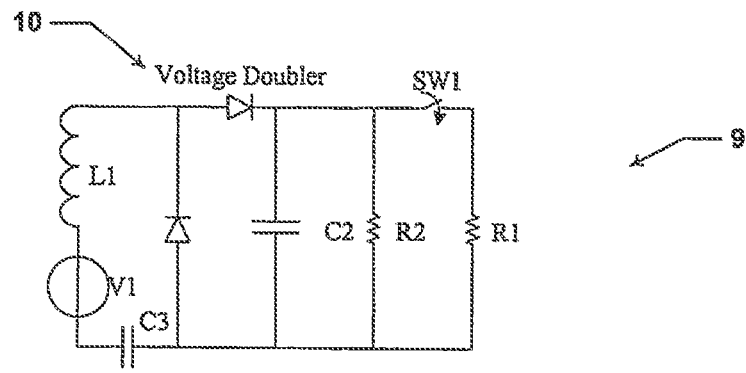
FIG. 5 is a symbolic circuit diagram of a further embodiment of the invention that includes a voltage doubler circuit.

In FIG. 5, an integrated circuit 9 includes a voltage doubler circuit 10. In other embodiments use is made of other types of voltage multipliers, such as triplers or quadruplers. Since the impedance level of the coil used in many preferred embodiments is low—in the order of 200 ohms—it is, therefore, ideally suited to a connection with a voltage multiplier.

B. Embodiments with a Transistor

Figure 6:
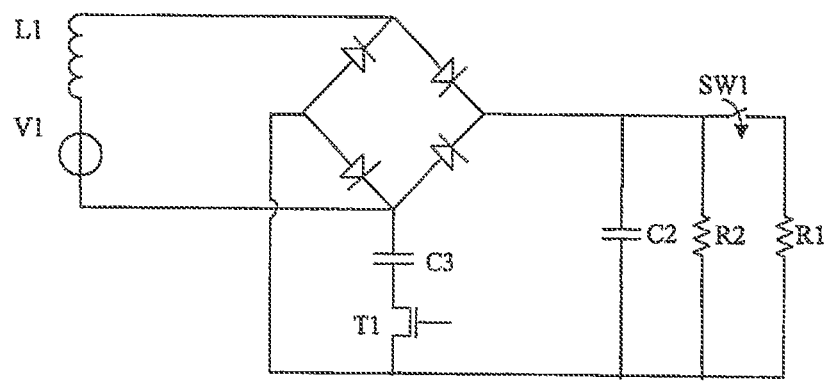
FIG. 6 is a symbolic circuit diagram of a further embodiment of the invention that includes both a voltage doubler circuit and a full wave circuit.

In FIG. 6, a switch in the form of a MOSFET transistor T1, is used to select either the normal current state or the low current state. (T1's drive is provided by the transceiver.) When transistor T1 is closed and opened, the circuit respectively acts as a voltage doubler and a full wave rectifier.

The voltage doubler has a voltage gain of two, and transforms the load impedance of the chip by a factor of 8. In contrast, the full wave rectifier has a voltage gain of one, and transforms the load impedance by a factor of 2. Thus, since the voltage doubler circuit draws a significantly larger current from the antenna coil, it acts as the normal current state rectifier. In contrast, the full wave rectifier is switched "on" during the low current state.

C. Embodiments with an Extra Impedance

In FIG. 6, circuit 11 includes a sub-circuit 12 that provides an extra impedance Z2 in series with the antenna coil L1 when circuit 11 is in the low current state. Z2 can be a resistance, capacitance, inductance or a combination of any, or all, of these. The extra impedance causes a drop in voltage across itself and reduces I2. This is advantageous for reducing the current drawn from the antenna during the low current state.

Figure 7:
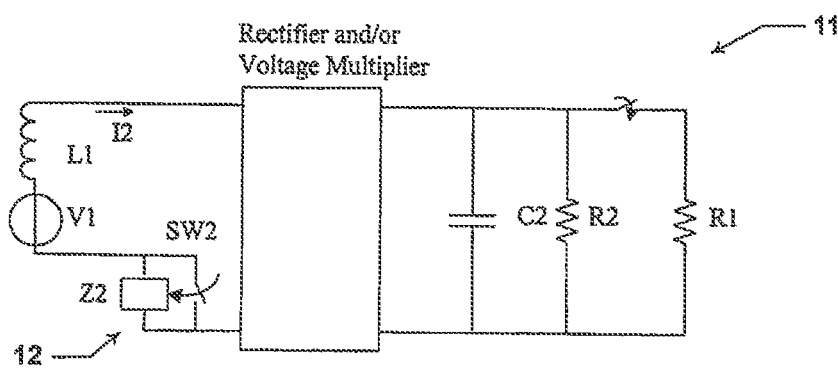
FIG. 7 is a symbolic circuit diagram of a further alternative embodiment of the invention that includes a circuit for changing the current collection efficiency of the antenna.

In other embodiments, such as that shown in FIG. 7, circuit 12 is placed on the DC side of the rectifier and a resistor R3 is used to reduce 12.

D. Embodiments with a Shunt Regulator

Figure 8:
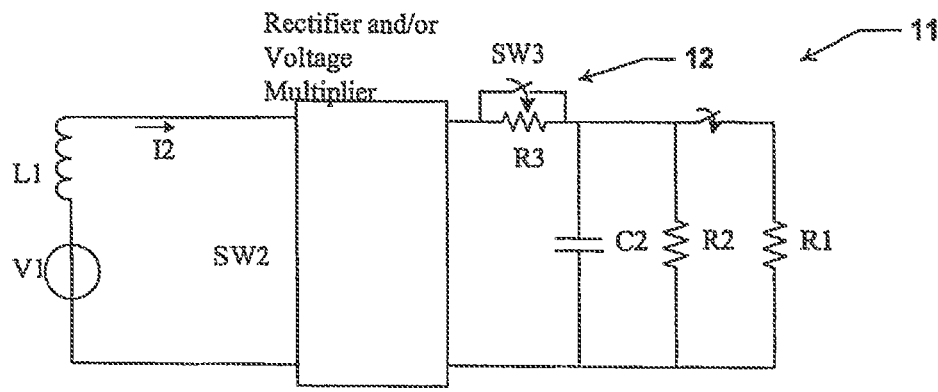
FIG. 8 is a symbolic circuit diagram of a further embodiment of the invention where the circuit for changing the current collection efficiency is on the DC side.

The embodiment shown in FIG. 8 includes a circuit 15 that utilises a shunt regulator 16 for controlling the operating voltage provided to the integrated circuit. A detailed explanation of the operation of the shunt circuit is given in U.S. Pat. No. 5,045,770.

In essence, the IC's operating voltage is changed such that the low current state's operating voltage, VA+VB, is higher than the normal current state's operating voltage, VB. When the IC's is at the higher operating voltage, the transceiver portion of the device operates at a lower current—therefore, less current is drawn from the antenna.

The low current state operating voltage is set as high as is possible given the limitations of the IC technology. In this embodiment, for example, VA+VB=4.2 volts and VB=2.1 volts.

E. Embodiments with a Series Regulator

Figure 9:
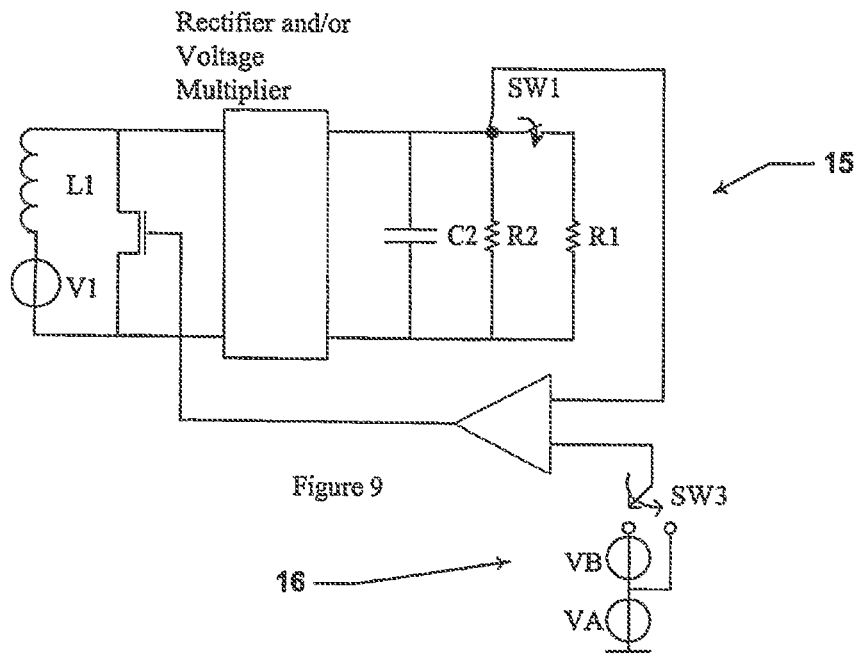
FIG. 9 is a symbolic circuit diagram of another embodiment of the invention that includes a circuit for changing the operating voltage.
Figure 10:
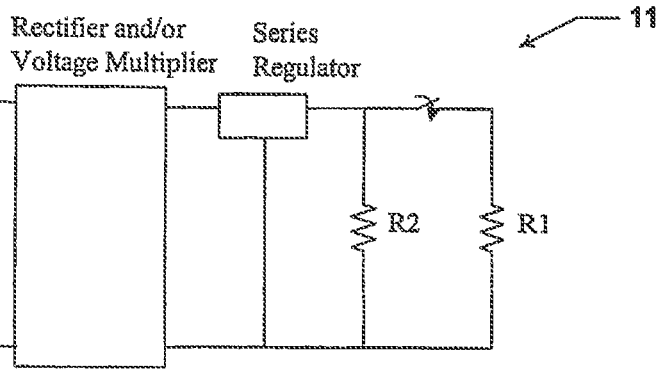
FIG. 10 is a symbolic circuit diagram of a further embodiment of the invention that includes a series voltage regulator circuit.

The embodiment of FIG. 9 includes a circuit that utilises a series regulator for controlling the operating voltage. The input voltage to the regulator increases when the circuit toggles into the low current state.

Systems Incorporating the Device

FIG. 12 illustrates an application of an embodiment of the invention as an inventory system for jewels. Previously, this process has been achieved manually, and is therefore both time consuming and prone to error.

In this embodiment, 100 small envelopes are horizontally stacked in a cardboard box; each envelope storing a jewel and a report on the characteristics of the jewel. As is evident from FIG. 13, a plurality of RED tags 1 may be placed within a few millimeters of each other without impacting on the devices' reliability.

Since each tag 1 is programmed with the contained jewel's characteristics, its uniquely coded identification signal will provide the interrogator with data that is indicative not only of the identity of each tag in the box, but also of the jewel contained within each envelope. Accordingly, the whole box of jewels is accounted for in one automatic process. There is no need to take the envelopes out of the box and separate them to "safe" distances from each other.

In this way, security is more easily maintained as well. For instance, the interrogator may be placed at a passage (through which the box is placed) between a safety deposit storage area and a customer service area. Preferably, the personnel progressing the box also carries a tag so that their identity may be determined.

The Determination of "State"

Figure 13:
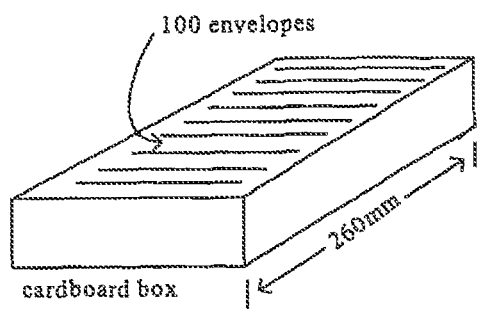
FIG. 13 is a perspective view of a plurality of stacked envelopes, each of which contains a device according to FIG. 3.

As mentioned earlier, to maximise the reliability of the operation of closely stacked or spaced tags, such as those used in FIG. 13, the tags operate in either of two current states. At any one time, a small proportion of the tags are in a normal current state where the tags are responsive to the interrogator, and the remainder of the tags are in a low current state where they are not fully functional. Accordingly, in the FIG. 12 embodiment, where the tags must operate within a few millimeters of each other, the probability of an individual tag being in the normal state is $\frac{1}{16}$.

Generally speaking, the longer the tags are disposed within the interrogation field, the lower the normal state probability may be. In other embodiments having only a few tags, the probability of the tags being in the normal state can also be decreased. In such instances, the spacing between tags can thereby be further decreased as well.

The selection of state is made using a predetermined algorithm. An example of a preferred algorithm is a random or a pseudo-random number algorithm.

A. Autonomous Selection

In a preferred embodiment, the tags randomly select their current state autonomously. That is, the tags randomly choose a current state; receive commands and/or data, and/or transmit replies; and then randomly choose a new current state.

B. Responsiveness to Interrogation Signals

In alternative embodiments, the interrogation signals are used to direct tags to select a new current state, and the tags randomly choose their current state. These interrogation signals, in some embodiments, take the form of short breaks in the interrogation field. Examples of such breaks include a single break and a coded break (where the codes are sequences of breaks directing the tags to perform a various current state selection).

In further alternative embodiments, other forms of modulation of the interrogation field are used to direct tags in their selection of current state. Examples of such modulations include amplitude, phase, and frequency modulation.

C. Probabilities

The precise proportion of tags selecting the normal state is not critical, except in so far that the coupling between tags is reduced sufficiently to allow reliable operation. The probabilities or proportion of operating tags should be selected to suit the number and spacing of tags and can be determined by experiment.

Moreover, the algorithm may be structured so that a tag will be guaranteed to have been in the normal current state at least once every "n" state selections, where "n" is the reciprocal of the probability of selecting the normal state. A simple method of ensuring this is to force the selection of the normal current state if it has not been selected after a fixed number of selections. The value of this fixed number can be selected to suit the number and spacing of tags.

D. Use of Unique Tag Number

Alternatively, each tag selects a current state dependent upon a fixed number, such as a unique number. In such preferred embodiments, the tag uses a portion of that number to choose a current state. More particularly, in the FIG. 12 embodiment, each tag's unique number includes a 4-bit mask value. The 4-bit value represents the number of interrogator breaks, or commands, received before the tag enters the normal current state. The field transmitted by the interrogator can be modulated to transmit commands to the tags. Various methods of modulating the field such as pulse, amplitude, frequency and phase are widely used and understood.

In further embodiments, the mask may be altered each time the tag exits the normal state. In this way, adjacent tags with similar numbers are prevented from moving to the normal current state at the same time.

Larger and smaller probabilities can be selected by using smaller and longer masks. The mask can also be reduced or increased in length so that probabilities of 1, ¼, ⅛, $\frac{1}{16}$, and $\frac{1}{32}$ can be selected by employing masks of 0, 1, 2, 3, 4 and 5 bits respectively.

Figure 14:
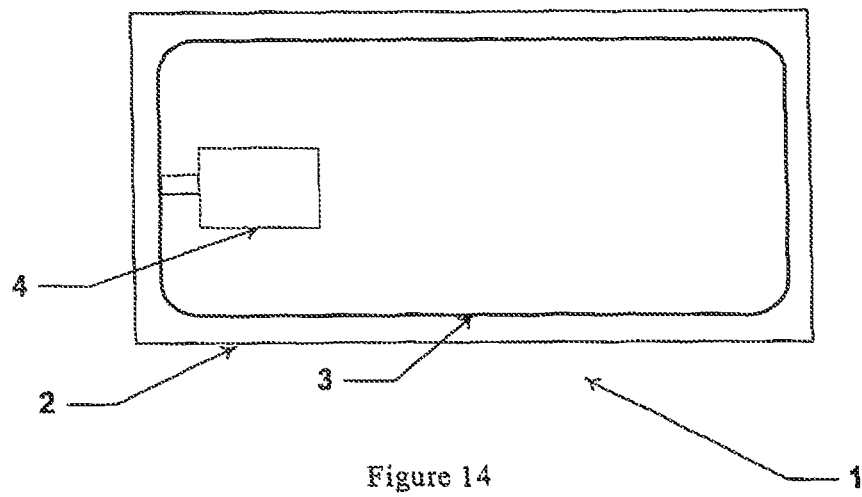
FIG. 14 is a plan view of the device of FIG. 3.

Another application is illustrated in FIG. 14, where tag 1 is shown disposed between two cut-away layers 21 and 22 of a laminated envelope 23. While tag 1 is shown in the Figure as protruding from between the layers, that is for purposes of illustration only. It will be appreciated that, in use, tag 1 is completely enclosed by the layers. Importantly, since tag 1 is operable, even when in close proximity to a number of like tags, it is possible to reliably interrogate the tags.

Further Applications

Figure 19:
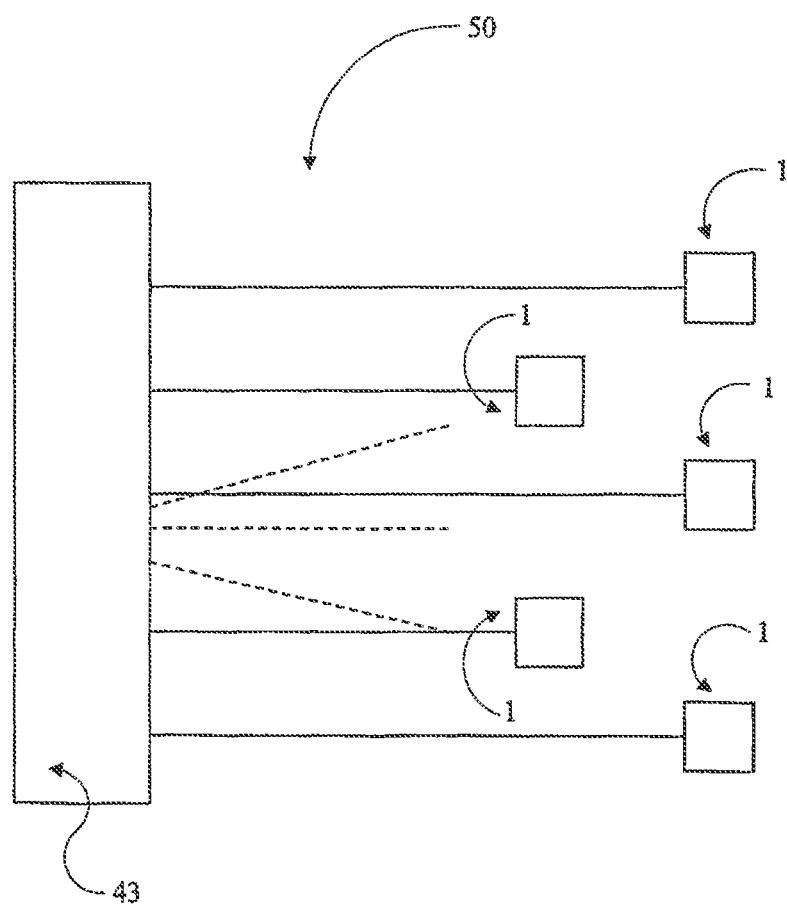
FIG. 19 is a schematic representation of a system according to a preferred embodiment of the invention.

FIG. 19 depicts a system 50 according to a preferred embodiment of the invention. As shown, an interrogator 43 integrates a plurality of devices 1.

For postal envelopes, the user is able to pre-program the tags 1 to include address and content information to facilitate the sorting of the envelope. Moreover, in some embodiments, the tag is pre-programmed with an encrypted message for the intended recipient. For courier envelopes, the courier may pre-program the tag to include data about the intended recipient, the contents of the envelope, the priority of the required delivery, and other data.

Figure 15:
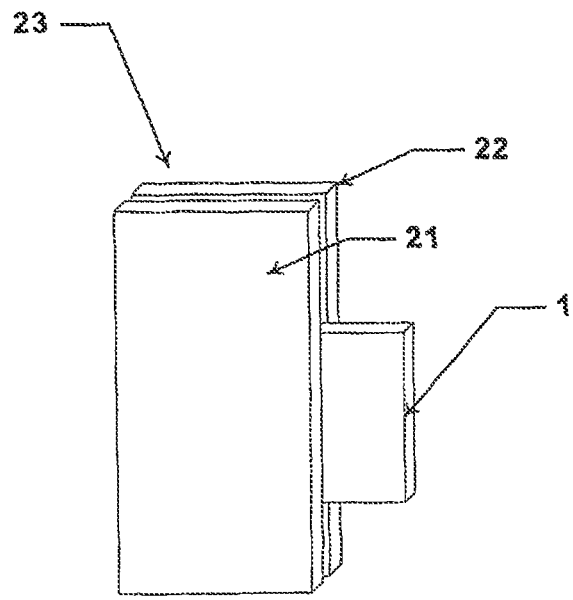
FIG. 15 is a perspective cut-away view of a parcel according to another aspect of the invention.

Although the tag 1 is shown sandwiched between two layers of the envelope in FIG. 15, in other embodiments it is attached by other means. For example, one embodiment makes use of a plastics pocket formed on the exterior layer of the envelope for selectively receiving the tag. In another embodiment, the tag is simply placed within the envelope with the other contents. Further, attached to parcels, the invention is particularly advantageous because loosely packed parcels will often lie directly adjacent to one another—without any separation. Other alternatives will also be apparent to the skilled addressee in light of the teaching herein.

In another embodiment of the invention, a tag is disposed within the packaging for a saleable item. Following the placement of the item into the packaging the tag is programmed to include data indicative of the quantity or quality of the contents. This allows ease of distribution and inventory control from the point of packaging to the ultimate point of sale. This embodiment is particularly advantageous when applied to packaging for computer software. However, it is also applicable to other items such as compact disc's, toys, integrated circuits, books, and any other goods that are packed closely together for storage or transportation.

In more complex embodiments, a number of tags are associated with a single article. In the case of an envelope for courier use, one of the tags contains data readable only by the courier organisation, while another tag includes data only readable by the sender and recipient of the envelope.

The Interrogator

The interrogator 43 is either a fixed installation device or, in other embodiments, a handheld device. In any event, the interrogator provides an interrogation signal—preferably in the form of a RF field—that is detected by, and selectively responded to, by each tag in its field.

Reusability and Reliability

The RED tags of the preferred embodiments provide a re-usable resource, as the tags are re-programmable. Moreover, unlike bar codes, they will not be so easily disabled through physically rough handling.

Other Benefits Associated with the Present System

Since prior art system, tags are used to identify items such as baggage and are designed to operate at ranges of up to 1 meter, the application of such technology is thereby limited to circumstances where tags are well spaced apart. In sharp contrast, the preferred embodiments of the invention are able to be stacked closely and continue to reliably operate.

A typical application is the identification of RFID tags attached to bundles of letters where the tag data is used to control the automatic sorting of each letter. However, the invention is not limited to this particular field of use. For example, various aspects of the invention are applicable to systems used for identification or inventory management of items such as shoe uppers, shoe soles, diamonds, and jewelry.

Moreover, in addition to allowing ease of inventory control, the invention facilitates the automated sorting of those articles. This is well illustrated in the context of the jewel handling system and also in the context of mail handling systems—where each piece of mail includes a tag.

Accordingly, the preferred embodiments may be applied advantageously to various uses such as item identification, stock control, and inventory management. By having the ability to reliably operate in "close" ranges, such as when stacked, the application's tag and system allow these processes to be done in bulk and automatically—without the need for manual intervention. Accordingly, the preferred embodiments of the invention provide many significant advantages over prior art systems.

Although the invention has been described with reference to a number of specific examples, it will be appreciated that by those skilled in the art that the invention can be embodied in many other forms.

The invention claimed is:

1. A Radio Frequency Identification Device (RFID) comprising:
  a receiver configured to receive a first signal and employ the first signal in order to generate a voltage adapted to power the RFID, the receiver including an inductance and substantially zero-tuning capacitance;
  a transmitter configured to generate a second signal;
  a state selector configured to randomly or pseudo-randomly cause the RFID to be in a first state or a second state,
  wherein a relatively larger amount of a first current flows through the receiver in the first state, and a relatively smaller amount of the first current flows through the receiver in the second state.

2. The RFID according to claim 1, further comprising:
  an integrated circuit that includes the state selector; and
  a connection between the receiver and the integrated circuit,
  wherein the receiver is further configured to generate first current from the voltage; and
  wherein the relatively smaller amount of the first current causes the receiver to not interfere with operation of an identification device in close proximity to the RFID.

3. The RFID according to claim 2, wherein:
  a first probability is associated with the first state;
  a second probability is associated with the second state; and
  the first probability is lower than the second probability.

4. The RFID according to claim 3, wherein the relatively smaller amount of current is at least less than approximately 100 µA.

5. The RFID according to claim 2, wherein the relatively smaller amount of the first current is less than 50% of the relatively larger amount of the first current.

6. The RFID according to claim 3, wherein the first probability and second probability are at least partially random.

7. The RFID according to claim 2, wherein the connection comprises a voltage rectifier with a selectable voltage multiplication factor and wherein an increase in the voltage multiplication factor causes the receiver to draw more current.

8. The RFID according to claim 1, wherein allowing an increase in the voltage of the RFID causes the receiver to draw less current.

9. The RFID according to claim 1, further including an impedance in series with the receiver.

10. The RFID according to claim 9, wherein the impedance is at least one of a resistor, a capacitor and an inductor.

11. The RFID according to claim 9, wherein the impedance is a switched impedance.

12. The RFID according to claim 9, further comprising an AC impedance, wherein increasing the AC impedance causes the receiver to draw less current.

13. The RFID according to claim 9, further comprising a shunt regulator configured to control the generated voltage.

14. The RFID according to claim 9, further comprising an extra impedance in series with the receiver.

15. The RFID according to claim 9, further comprising an extra impedance in series with the integrated circuit.

16. The RFID according to claim 15, wherein the extra impedance is a switched impedance.

17. The RFID according to claim 1, wherein the transmitter is connected to, and responsive to, a series regulator.

18. The RFID according to claim 1, wherein the first current flowing through the receiver in the first state powers the RFID, and the relatively smaller amount of current flowing through the receiver in the second state is sufficient to power the RFID enough to determine when to change from the second state to the first state.

19. A Radio Frequency Identification Device (RFID) comprising:
  a receiver including a coil with no tuning capacitance configured to receive a first signal;
  a transmitter configured to generate a second signal;
  a state selector configured to randomly or pseudo-randomly cause the RFID to be in a first state in which a first current flows through the receiver, or a second state in which a second current flows through the receiver,
  wherein the first current is greater than the second current.

20. The RFID according to claim 19, wherein the transmitter does not transmit the second signal when the RFID is in the second state.

21. The RFID according to claim 20, wherein the transmitter transmits the second signal when the RFID is in the first state.

22. The RFID according to claim 19, further including in series with the receiver a voltage rectifier with a selectable voltage multiplication factor and wherein an increase in the voltage multiplication factor causes the receiver to draw more current.

23. The RFID according to claim 19, wherein allowing an increase in the output voltage of the RFID causes the receiver to draw less current.

24. The RFID according to claim 19, further including an impedance in series with the receiver.

25. The RFID according to claim 24, wherein the impedance is at least one of a resistor, a capacitor and an inductor.

26. The RFID according to claim 24, wherein the impedance is a switched impedance.

27. The RFID according to claim 19, further comprising an AC impedance, wherein increasing the AC impedance causes the receiver to draw less current.

28. The RFID according to claim 19, further comprising a shunt regulator configured to control the generated voltage.

29. The RFID according to claim 19, further comprising an extra impedance in series with the receiver.

30. The RFID according to claim 19, further comprising an extra impedance in series with the integrated circuit.

31. The RFID according to claim 30, wherein the extra impedance is a switched impedance.

32. The RFID according to claim 19, wherein the transmitter is connected to, and responsive to, a series regulator.

33. The RFID according to claim 19, wherein the first current flowing through the receiver in the first state powers the RFID, and the second flowing through the receiver in the second state is sufficient to power the RFID enough to determine when to change from the second state to the first state.

* * * * *